United States Patent [19]

Washino et al.

[11] Patent Number: 4,905,648
[45] Date of Patent: Mar. 6, 1990

[54] IGNITION TIMING CONTROL APPARTAUS FOR AN INTERNAL COMBUSTION ENGINE

[75] Inventors: Shoichi Washino; Satoru Ohkubo, both of Amagasaki, Japan

[73] Assignee: Mitsubishi Denki Kabushiki Kaisha, Tokyo, Japan

[21] Appl. No.: 250,239

[22] Filed: Sep. 28, 1988

[30] Foreign Application Priority Data

Sep. 29, 1987 [JP] Japan ................... 62-246558

[51] Int. Cl.⁴ .................... F02P 5/15; F02P 5/12
[52] U.S. Cl. ........................... 123/425; 364/431.08
[58] Field of Search ............ 123/425, 435; 73/35, 73/117.3; 364/431.08

[56] References Cited

U.S. PATENT DOCUMENTS 4,397,285 8/1983 O'Neill .................. 123/425
4,466,408 8/1984 Cheklich ............... 123/425
4,788,854 12/1988 Javaherian ............ 73/117.3

FOREIGN PATENT DOCUMENTS

3546168 7/1986 Fed. Rep. of Germany .
3704839 8/1987 Fed. Rep. of Germany .
212643 10/1985 Japan .
15466 4/1988 Japan .

Primary Examiner—Tony M. Argenbright
Attorney, Agent, or Firm—Oblon, Spivak, McClelland, Maier & Neustadt

[57] ABSTRACT

An ignition timing control apparatus for an internal combustion engine includes a pressure detector for detecting an inner pressure of cylinder of the engine, a crank angle detector for detecting a crank angle of the engine, and a control device which receives the detection signals of the pressure detector and the crank angle detector so that an effective calorific value Q of fuel in one ignition cycle and an effective combustion rate K of fuel or a low level calorific value Hu of fuel are calculated on the basis of an inner pressure of cylinder $P(\theta)$ at a crank angle in compression and expansion strokes in the one ignition cycle, the crank angle $\theta$ and a cylinder capacity $V(\theta)$. Ignition timing is controlled based on at least one of the effective calorific value Q and the effective combustion rate K.

8 Claims, 6 Drawing Sheets

IGNITION TIMING CONTROL APPARTAUS FOR AN INTERNAL COMBUSTION ENGINE

BACKGROUND OF THE INVENTION

1. Field of the Invention

The present invention relates to an ignition timing control apparatus for an internal combustion engine capable of controlling ignition timing so as to always obtain the maximum torque regardless of a kind of fuel and generation of knocking, and regardless of change with time of the engine and fuel to be used.

2. Discussion of Background

As a conventional ignition timing control apparatus for an internal combustion engine, there is one disclosed, for instance, in Japanese Unexamined Patent Publication No. 3175/1984 or Japanese Examined Patent Publication No. 61897/1982.

Various methods of controlling knocking in the engine by using a knocking sensor have been known. There have been two types of method for controlling an engine having a plurality of cylinders. Namely, a type that all cylinders are simultaneously controlled and a type that cylinders are separately and independently controlled.

Generally, there is differences in compression ratio, air-fuel ratio and temperature of combustion chamber wall between cylinders, and an ignition timing in which a knocking occurs is different for each of the cylinders. Accordingly, an excellent output is obtainable by detecting a knocking level for each of the cylinders and by controlling the cylinders so that an ignition timing is delayed for only cylinders in which a knocking takes place.

In the conventional ignition timing control of the cylinders, a basic ignition timing which is common to each of the cylinders is obtained in response to operational conditions of the engine, and a control at the lead angle side is made different from that at the lag angle side. Namely, the control is made so as not to advance an ignition timing beyond the basic ignition timing at the lead angle side. With respect to the lag angle side, in order to avoid substantial reduction of torque by unnecessarily lagging the angle of ignition timing in the judgement that knocking takes place by an increased output of a knocking sensor due to scattering in sensitivity, noises and mechanical vibrations in the sensor, a control of knocking level at the lag angle side is conducted in such a manner that a limit value is previously determined in the lag angle region at the point determined by the calculation of [an ignition timing which causes a light knocking condition (the so-called a trace knocking)] $-\delta°$, or at the point of MBT (Minimum advance for Best Torque) $-\delta°$ when the MBT point is at the lag angle side with respect to a trace knocking point. In this case, it is preferable to determine $\delta°$ to be about $5°-6°$. In more detail, at first, an ignition is carried out in accordance with the basic ignition timing. When knocking takes place, the ignition timing is delayed so as to correspond to its knocking level to thereby produce a light knocking condition. When there occurs no knocking by such lag angle operation, a lead angle operation is again taken because the ignition timing is excessively delayed. As a result, a light knocking condition is always produced.

If an ignition timing is ahead of the basic ignition timing by such lead angle operation, the ignition timing is adjusted to meet the basic ignition timing. As the basic ignition timing, an ignition timing which provides the maximum torque at a level lower than the light knocking level is determined.

Figure 5:
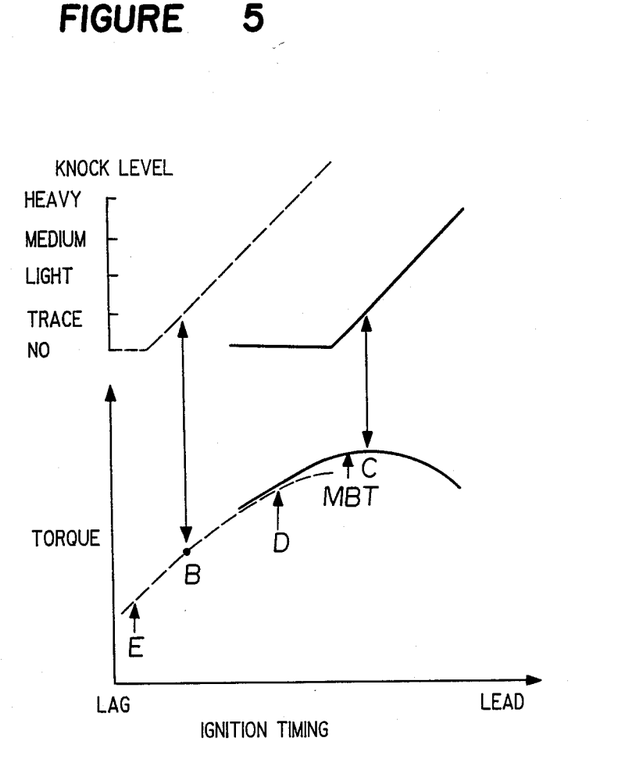
FIGS. 5 and 6 are respectively characteristic diagrams showing relations of knocking levels and a torque to ignition timings.

The relation between an ignition timing and a torque generated under a light load condition of engine is indicated by a broken line in FIG. 5. Namely, the ignition timing to obtain the maximum torque (MBT) is deflected toward the lag angle side with respect to the ignition timing to obtain a light knocking level indicated by a point A. However, the relation between an ignition timing and a torque under a heavy load condition is indicated by a solid line in FIG. 5. When gasoline having a low octane is used, the ignition timing to obtain a light knocking level indicated by a point B is deflected toward the lag angle side with respect to the MBT.

When gasoline having a high octane is used, an ignition timing to obtain a light knocking level moves to a point C. There is a case that the MBT is moved to the lag angle side (a high revolution side). Accordingly, the basic ignition timing should be determined at the MBT under a light load condition, and the basic ignition timing should be at the light knocking level or the MBT under a heavy load condition.

In the conventional ignition timing control apparatus having the construction described above, a control of the ignition timing to obtain the maximum torque could not always be obtained in case that the relation among the time of determination of the basic ignition timing, the MBT in actual use and the ignition timing to obtain a light knocking level becomes irregular due to change with time of the engine, or due to a kind of fuel to be used (such as a high octane gasoline, a regular gasoline, alcohol-containing gasoline).

Figure 6:
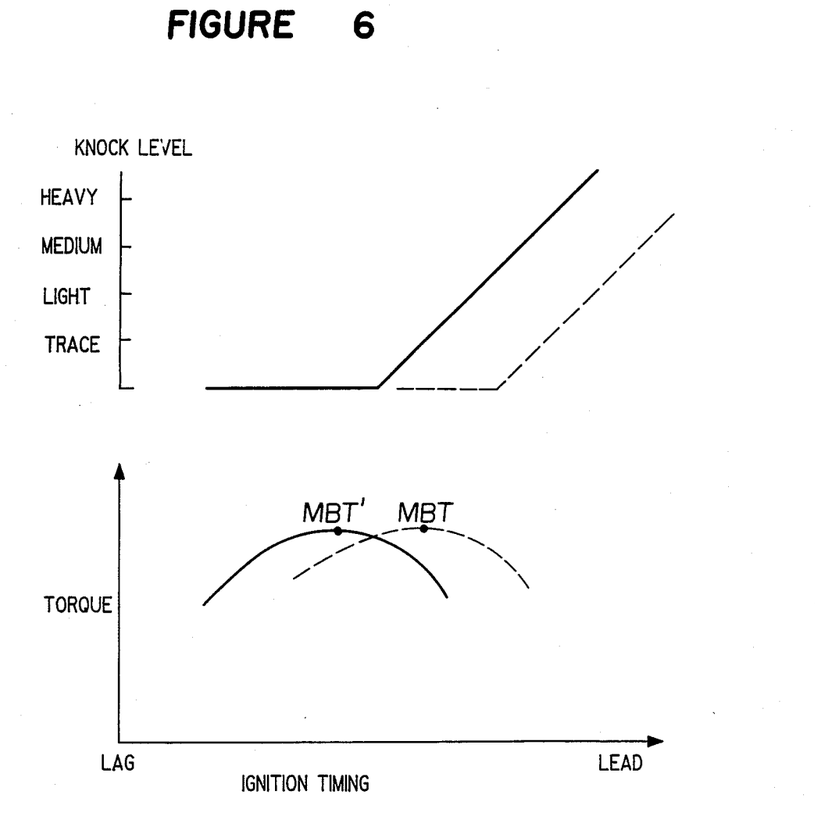

FIG. 6 shows the control of the conventional apparatus described above. In FIG. 6, broken lines represent relations of a knocking level and a torque produced at the time of determination of the basic ignition timing, and solid lines represent relations of a knocking level and a torque produced in actual use affected by the change with time of the engine with respect to an ignition timing.

In a conventional ignition timing control apparatus, since no knocking takes place when the basic ignition timing is just determined, a control is so made as to obtain the MBT for each ignition. However, in the operation having the above-mentioned relation as indicated by the solid line, the ignition timing which provides the maximum torque is moved to a point MBT'. Accordingly, it is clear that the ignition timing as the object of the control is not the ignition timing which provides the maximum torque.

Thus, the conventional ignition timing control apparatus has a problem that it is difficult to control suitably in response to the change of characteristics of the engine, i.e. it is difficult to control ignition timing so as to always obtain the maximum torque.

SUMMARY OF THE INVENTION

It is an object of the present invention to provide an ignition timing control apparatus for an internal combustion engine capable of controlling ignition timing so as to always obtain the maximum torque regardless of generation of knocking.

The foregoing and the other objects of the present invention have been attained by providing an ignition timing control apparatus for an internal combustion engine which comprises a first detecting means for detecting an inner pressure of cylinder of the engine, a second detecting means for detecting a crank angle of the engine, and a control device which receives the detection signals of the first and second detecting means so that an effective calorific value Q of fuel in one ignition cycle, an effective combustion rate K of fuel or a low level calorific value Hu of fuel are calculated on the basis of an inner pressure of cylinder $P(\theta)$ at a crank angle in a compression and expansion strokes in the one ignition cycle, the crank angle $\theta$ and a cylinder capacity $V(\theta)$, whereby ignition timing is controlled based on at least one of the effective calorific value Q and the effective combustion rate K.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

An embodiment of the present invention will be described in detail with reference to the drawings.

Figure 1:
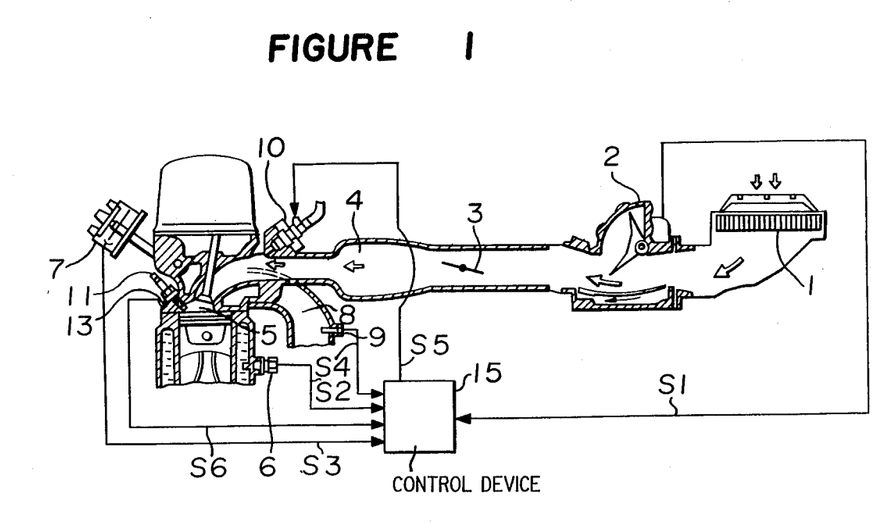
FIG. 1 is a structural diagram of an embodiment of the ignition timing control apparatus for an internal combustion engine according to the present invention.
Figure 2:
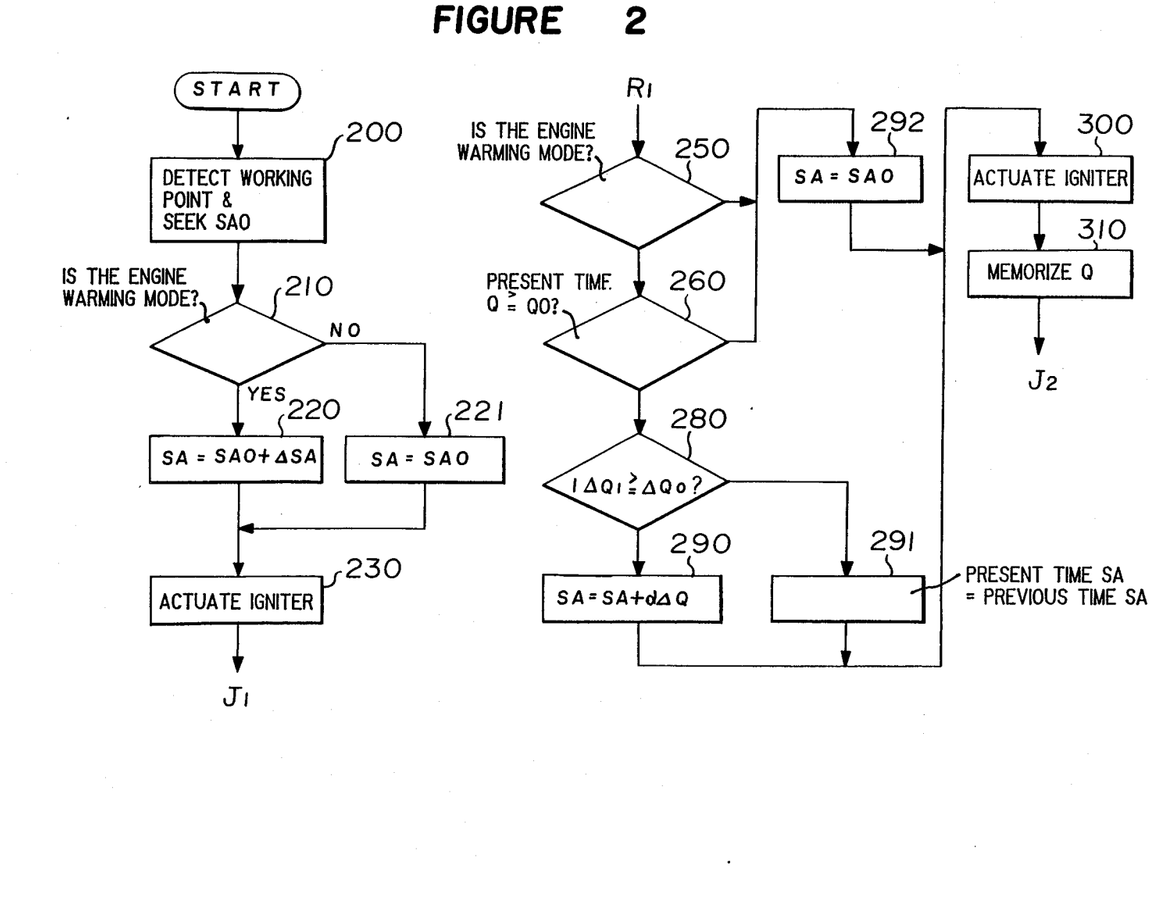
FIG. 2 is a flow chart to obtain an ignition timing control in the above-mentioned embodiment.

In FIG. 1 showing the structure of the apparatus according to the present invention and FIG. 2 showing a flow chart which illustrates a treatment to obtain by calculation an effective calorific value Q and an effective combustion rate K in a control device 15 shown in FIG. 1, a reference numeral 1 designates an air cleaner, a numeral 2 designates an air-flow meter disposed in an air intake pipe to detect an amount of air to be sucked, a numeral 3 designates a throttle valve disposed in the air intake pipe, a numeral 5 designates a cylinder block, a numeral 6 designates a water temperature sensor to detect the temperature of cooling water for the engine, a numeral 7 designates a crank angle sensor, a numeral 8 designates an exhaust manifold, a numeral 9 designates an exhaust gas sensor disposed in the exhaust manifold to detect a concentration of exhaust gas component (such as a concentration of oxygen), a numeral 10 designates a fuel injection valve, a numeral 11 designates an ignition plug, a numeral 13 designates a pressure sensor to detect an inner pressure of a cylinder, and a numeral 15 designates a control device.

The crank angle sensor 7 is adapted to output a reference position pulse at every reference position of the crank angle (for instance, every 180° in a four cylinder engine and every 120° in six cylinder engine) and to output a unit angle pulse at every unit angle (for instance, every 1°). The control device 15 counts the number of the unit angle pulses upon receiving a reference position pulse to thereby obtain the crank angle at the time when the reference position pulse is received. Further, in the control device 15, a revolution speed of engine is obtainable by measuring the frequency or the period of the unit angle pulses.

In the apparatus shown in FIG. 1, the crank angle sensor 7 is installed in a distributor.

The control device 15 receives a crank angle signal S3 from the crank angle sensor 7, a signal of exhaust gas S4 from the exhaust gas sensor 9, a signal of water temperature S2 from the water temperature sensor 6, a signal of intake air quantity S1 from the air-flow meter 2, and a signal of pressure S6 from the pressure sensor 13. The control device 15 also receives a signal of battery voltage and a signal indicative of the throttle valve being fully closed although the signals are not shown in FIG. 1.

The control device 15 is constituted by a microcomputer comprising a CPU, a RAM, a ROM, input/output interfaces and so on.

The operation of the ignition timing control apparatus of the present invention will be described.

Figure 3:
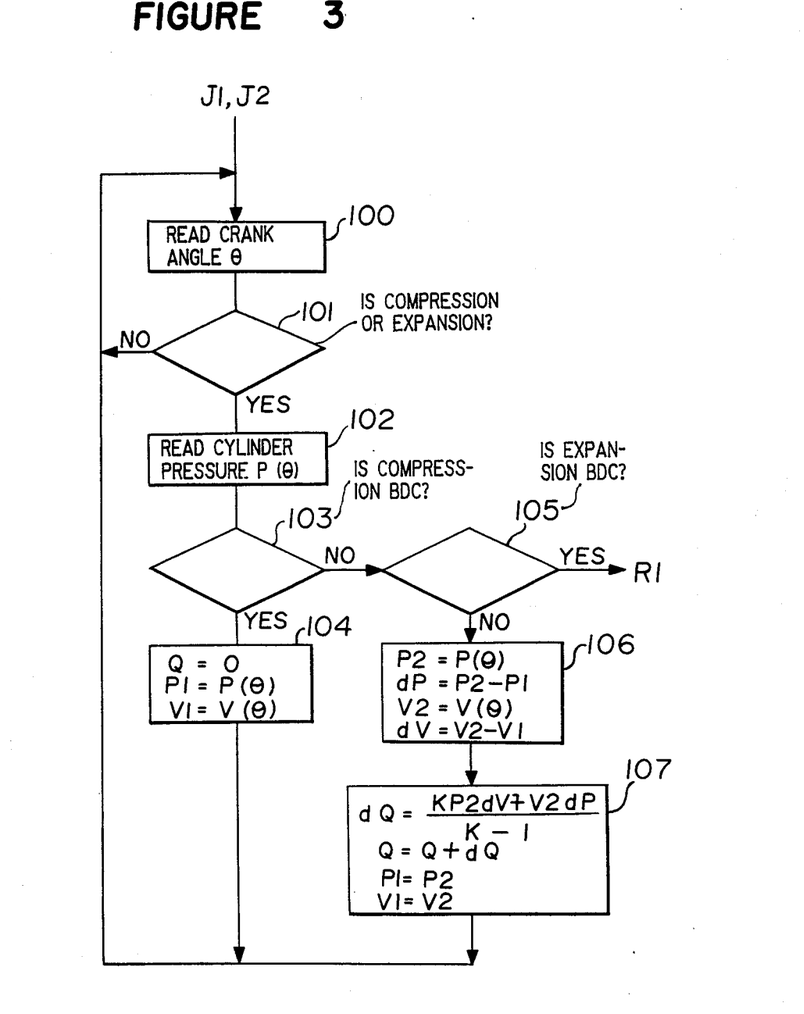
FIG. 3 is a flow chart to obtain by calculation an effective calorific value Q in the embodiment shown in FIG. 1.

The control device 15 conducts data processings to obtain an effective calorific value Q as shown in FIG. 3 and an ignition timing control as shown in FIG. 2, in addition to an ordinary fuel control.

Description will first be made as to the fuel control. The control device 15 calculates a fuel injection quantity of fuel to be supplied to the engine by operating the above-mentioned signals S1, S2, S3, S4 and other signals such as a battery voltage signal and a throttle fully closing signal, and outputs an injection signal S5 to the fuel injection valve 10, whereby the valve 10 is actuated to supply a given amount of fuel to the engine.

Operations to obtain an fuel injection quantity Ti are carried out in the control device 15 by using the following equation:

$$Ti = Tp \times (1 + Ft + KMR/100) \times \beta + Ts \quad (1)$$

where Tp is a basic injection quantity which is obtained by $Tp = K_O \times A/F \times Ga/N$ wherein Ga is an intake air quantity, N is an engine revolution speed, A/F is an air-fuel ratio, $K_O$ is a constant, Ft is a correction coefficient corresponding to the temperature of cooling water for the engine, which assumes a large value as the temperature of cooling water is low, KMR is a complementary coefficient at a heavy load, which can be taken a data table which is previously prepared including values corresponding to the basic injection quantity Tp and the revolution speed N, Ts is a correction coefficient depending on a battery voltage, which is a coefficient for correcting variations in voltage which actuates the fuel injection valve, and $\beta$ is a correction coefficient corresponding to the signal of exhaust gas S4 of the exhaust gas sensor 9. By using the coefficient $\beta$, it is possible to effect a feed-back control of air-fuel ratio of a gas mixture for a predetermined value such as a value of a theoretical air-fuel ratio of 14.6.

In this case, when the feed-back control is effected by using the exhaust gas signal S4, correction by the coefficients Ft and KMR becomes meaningless since the air-fuel ratio of the gas mixture is controlled to always have a constant value. Accordingly, the feed-back control by the exhaust gas signal S4 is carried out only when the correction coefficients Ft and KMR are zero.

Description will be made as to data processings to obtain the effective calorific value Q which is essential to the present invention with reference to FIG. 3. First of all, a basic formula to calculate the effective calorific value Q and its physical meaning will be described. The following formula is established from the first law of thermodynamics:

$$dQ = du + Pdv$$

By substituting the following formulas $du = cvdT$ (specific internal energy), $Pv = RT$ (an equation of state) and $dT = (Pdv + vdP)/R$ in the right item in the above-mentioned equation, the following equation (1) is obtainable:

$$dQ = \frac{1}{k-1} \{KPdv + vdP\} \quad (1)$$

where K is a ratio of specific heat. When integrating the equation (1), the following equation (2) can be obtained:

$$Q = \frac{1}{k-1} [K \int P(\theta)dV(\theta) + \int V(\theta)dP(\theta)] \quad (2)$$

Namely, a net calorie (effective calorific value) Q given to a working gas in an ignition cycle is given by the equation (2), and it is obtained by integrating the equation (1), if an inner pressure of a cylinder at a crank angle $P(\theta)$ and cylinder capacity at a crank angle $V(\theta)$ are known.

On the other hand, since the net calorie (effective calorific value) Q given to the working gas in an ignition cycle is obtained by the difference between a calorie Qr produced in combustion and a calorie Qd released from the cylinder wall, the following equation (3) is obtained:

$$Q = Qr - Qd \quad (3)$$

When the weight of air sucked in an ignition cycle (air flow rate/revolution speed), a fuel-air ratio and a low level calorific value of fuel are respectively represented by Ga, F/A and Hu, $Qr = Hu \times (F/A) \times Ga$ is established. When the net calorie is represented in terms of a heat loss $(Qd \times Hu \times (F/A) \times Ga)$, the following equation (4) is obtainable:

$$Q = (1-Kd)Hu \times (F/A) \times Ga = K \times Hu \times (F/A) \times Ga \quad (4)$$

In the equation (4), K is an index indicating how much heat was effectively used with respect to heat produced by combustion, namely it is a parameter representing an effective combustion rate. Kd represents a rate of heat loss in heat produced by combustion. Kd assumes a very large value when a knocking takes place, for instance, when an ignition timing is at the lead angle side. It arises because a temperature boundary layer formed in the working gas and in contact with the cylinder wall is separated due to vibrations of pressure produced by the knocking, whereby a heat transmission from the working gas to the cylinder wall becomes very large. As a result, an effective calorific value Q becomes small. On the contrary, when the ignition timing is too late (in the case of lag angle) a calculated value of effective calorific value Q becomes small (as apparent from the equation (2)) because the inner pressure of cylinder is not large.

Accordingly, the effective calorific value is a physical quantity representing a calorie which is effectively converted to a torque in the actual calorific value of fuel. For instance, it shows a single peak characteristic with respect to ignition timing as shown by a curve in FIG. 4. If an amount of fuel to be used is not changed (accordingly, the low level calorific value Hu of fuel is constant), the effective combustion rate K also has a single peak characteristic with respect to ignition timing in the same manner as the effective calorific value Q. Accordingly, by calculating an effective combustion rate K or an effective calorific value Q on the basis of a cylinder pressure $P(\theta)$ and a cylinder capacity $V(\theta)$ and by controlling ignition timing so that either one of these values becomes the maximum, it is possible to always obtain the maximum torque regardless of occurrence of knocking.

The principle described above will be explained with respect to a flow chart shown in FIG. 3. FIG. 3 shows a flow chart for calculating an effective calorific value Q when a crank angle is sampled at each, for instance, 1°. Upon entering into the routine shown in FIG. 3 from the main routine (for instance, a flow chart shown in FIG. 2), a crank angle $\theta$ is read at Step 100, and then, determination is made as to whether or not the crank angle $\theta$ is in compression or expansion (combustion) strokes at Step 101. When "YES" at Step 101, a cylinder pressure $P(\theta)$ is read at Step 102. When "NO" at Step 101, the sequential step is returned to Step 100 at which the next crank angle is read.

At Step 103, determination is made as to whether or not the crank angle read at Step 100 is in the compression BDC. When the crank angle $\theta$ is in the compression BDC, a step of initialization is taken. Namely, arrangements of $Q = 0$, $P1 = P(\theta)$ and $V1 = V(\theta)$ are made at Step 104 and then, the sequential step is returned to Step 100.

When the crank angle $\theta$ is not the compression BDC, determination is made as to whether or not the crank angle $\theta$ is in the combustion (expansion) BDC at Step 105. When "NO", calculation of dQ is carried out at Steps 106, 107. When integrating calculation at Step 107 is "YES", the sequential step is returned to Step 100.

FIG. 3 is a flow chart showing a calculation processing to obtain the effective calorific value Q and the effective combustion rate K in the control device 15, as described before. In the routine shown in FIG. 2, an ignition timing control based on the so-called the principle of hill climbing is carried out. Namely, a working point of engine is detected at Step 200 and a basic ignition timing SAO is obtained from a previously prepared table. At Step 210, determination is made as to whether or not the engine is in a warm mode by detecting, for instance, the temperature of cooling water for the engine. When "NO" (i.e. in a cold mode), an ignition timing is set to the basic ignition timing SAO (at Step 221), and an ignitor is actuated at Step 230. Then, the routine to calculate the effective calorific value Q as shown in FIG. 3 is taken.

On the other hand, when "YES" (i.e. in a warm mode) at Step 210, an ignition timing is advanced by a predetermined angle ΔSA from the basic ignition timing SAO (at Step 220) and the ignitor is actuated at Step 230. Then, in the same manner as the previously described process, the routine to calculate the effective calorific value Q as shown in FIG. 3 is taken.

Returning to the routine shown in FIG. 2, processing is started from R1. Namely, determination is made as to whether or not the engine is in a warm mode by detecting, for instance, the temperature of cooling water for the engine once again (Step 250). When "NO" (i.e. in a cold mode), an ignition timing is kept at the basic ignition timing SAO (Step 292), and the routine to calculate the effective calorific value Q as shown in FIG. 3 is taken through Steps 300 and 310. When "YES" (i.e. the engine being in a warm mode) at Step 250, then, Step 260 is taken. At Step 260, determination is made as to whether or not the present value Q obtained in the routine shown in FIG. 3 is greater than a predetermined value Q0. When "NO" (i.e. the present value Q is smaller than the predetermined value Q0), the ignition timing SA is changed to the basic ignition timing SAO (Step 292) and the ignitor is actuated (Step 300).

When "YES" (i.e. the present value Q is greater than the predetermined value Q0), Step 280 is taken. At Step 280, the value Q (corresponding to the previous value Q) which was memorized at Step 310 is read so that the value of difference $\Delta Q$ between the present Q value and the previous value Q (=the previous value Q−the previous value Q) is obtained, and determination is made as to whether or not the absolute value $|\Delta Q|$ of the difference $\Delta Q$ between the present value Q and the previous value Q is greater than a predetermined value $\Delta Q0$.

When "YES", a lead angle of $\alpha \times \Delta Q$ is given to the previous ignition timing at Step 290. Namely, "the present ignition timing SA (at present)=the previous ignition timing SA (previous time)+$\alpha \times \Delta Q$ (where $\alpha > 0$; BTDC)" is set, and the ignitor is actuated at Step 300.

At Step 280, when it is found that the absolute value $|\Delta Q|$ of the difference $\Delta Q$ between the present value Q and the previous value Q is smaller than the predetermined value $\Delta Q0$ (i.e. "NO"), the ignition timing is kept to be the previous ignition timing (Step 291), and the ignitor is actuated at Step 300.

Upon actuation of the ignitor, the present value Q is memorized at Step 310, and the routine to calculate the effective calorific value Q as shown in FIG. 3 is again taken.

Thus, the ignition timing can be controlled so as to obtain the maximum effective calorific value Q, i.e. the maximum torque, by repeating a loop of R1→Step 260→Step 310→J2→ the routine as shown in FIG. 3 →R1.

Figure 4:
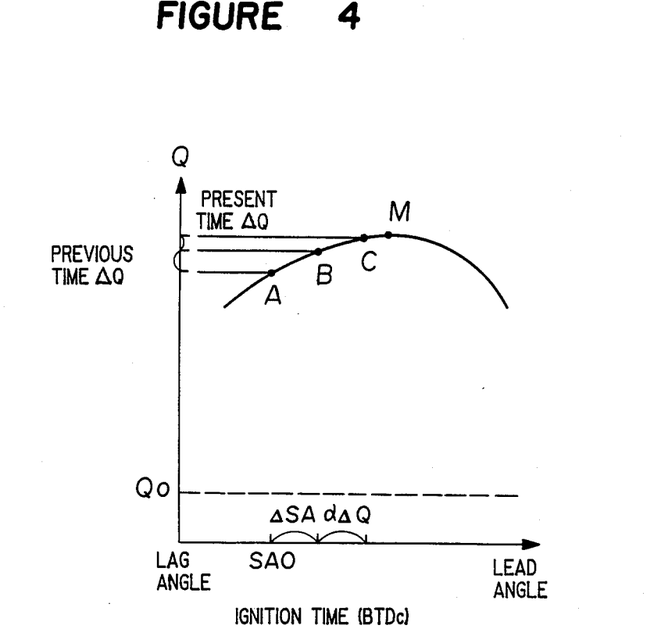
FIG. 4 is a characteristic diagram showing a relation of ignition timing to effective calorific values in order to show an effect obtained by a combination of the operations in FIGS. 2 and 3.

FIG. 4 is a diagram for illustrating the operations of the routines shown in FIGS. 2 and 3. In FIGS. 2 and 3, the ordinate represents the effective calorific value Q and the abscissa represents the ignition timing expressed in terms of BTDC (accordingly, an angle leads toward the right). An example of ignition timing control at the time when the engine is in a warm mode will be described with reference to FIG. 4.

During the operations from starting to Step 230 in FIG. 2, an ignition timing is advanced by the angle $\Delta SA$ over the basic ignition timing SAO which corresponds to the engine working point. Let's assume that when an ignition timing is the basic ignition timing SAO, the effective calorific value Q is represented by a point A in FIG. 4, and the effective calorific value Q obtained by calculation in the routine in FIG. 3 is represented by a point B.

The value of difference between B and A is obtained at Step 280 in FIG. 2. In FIG. 4, the value of $\Delta Q$ (B−A) is greater than the predetermined value $\Delta Q0$. Therefore, an ignition timing is further advanced by $\alpha \times \Delta Q$ at Step 290. Ignition is conducted at Step 300 and at Step 310, the effective calorific value Q is calculated. Then, the sequential step is returned to Step 250.

Since the engine is in a warm mode, Step 260 is taken where the value $\Delta Q$ (C−B) shown in FIG. 4 is again obtained. When the value $\Delta Q$ is greater than predetermined value Q0, the loop which is the same as the previous loop is repeated, whereby the ignition timing is further advanced by $\alpha \times \Delta Q$. By repeating such operation, the ignition timing approaches a point M in FIG. 4 which provides the maximum effective calorific value Q.

When the ignition timing further approaches the point M, the value $\Delta Q$ becomes smaller than the predetermined value $\Delta Q0$. Then, the sequential step moves from Step 280 to Step 291, where the ignition timing is fixed to an ignition timing near the point M.

The reason why the step of determining the effective calorific value Q being smaller or greater than the predetermined value Q0 at Step 260 in FIG. 2 is such that an ignition timing is kept at the basic ignition timing previously determined depending on the engine working point, and the ignition timing control is not effected in case that an abnormal condition is detected in the engine (for instance, the present value Q is smaller than the predetermined value Q0 when an erroneous firing occurs or efficiency of combustion is very low).

When the present value Q obtained by calculation is greater than the predetermined value Q0 while the absolute value $|\Delta Q|$ of the value of difference $\Delta Q$ between the present value Q and the previous value Q is smaller than the predetermined value $\Delta Q0$, it may be so determined that there is no meaningful difference between the present value Q and the previous value Q, and an ignition timing should be maintained as the previous ignition timing, and a special control should not be given. The value corresponds to an insensitive zone which avoids undesired operation in an ignition timing control due to scattering of the value Q for each ignition cycle. A further fine control can be obtained by determining the predetermined values Q0, $\Delta Q0$ and the coefficient $\alpha$ in correspondence to the engine working point. Therefore, it is desirable to memorize such values and coefficient in a data table.

For the present value Q, when Step 260 is taken for the first time in the routine in FIG. 2, it is desirable to use a value previously obtained on the basis of the engine working point. Accordingly, the value Q is preferably stored in a data table as well as the predetermined values Q0, $\Delta Q0$ and the coefficient $\alpha$. As a combination of parameters which determines the engine working point, the combination of (torque and engine revolution speed) or (intake air pipe pressure and engine revolution speed) or (intake air flow rate per unit revolution speed and engine revolution speed) may be used.

The routine shown in FIG. 2 can be carried out for, for instance, each cycle. However, calculation shown in FIG. 3 have to be carried out for, for instance, each one degree of crank angle. Accordingly, the calculation has to be carried out at an extremely high speed. Such high speed calculation is possible by using, for instance, a data-drive type processor (such as $\mu$PD7281, manufactured by Nippon Denki Kabushiki Kaisha) as a coprocessor. Namely, a host processor (which may be an ordinary Neumann processor) is used for carrying out calculation in the main routine and it is sufficient to use a coprocessor (a data-drive type processor) for carrying out calculation as shown in FIG. 3. In the main routine by the host processor, operations of fuel control (such as the calculation of the pulse width Ti of a fuel injection signal and judgement of an engine operating point), a control of a flow of operations of the routine in FIG. 3 and the operations as shown in FIG. 2 are conducted.

With this respect, a detailed explanation will be made. Namely, since the data-drive type processor is so adapted that operations are carried out in accordance with data, the flow of operations for carrying out the routine as in FIG. 3 is controlled by utilizing the feature of the processor as follows.

For instance, when a crank angle signal is input to the host processor, the host processor supplies the data of crank angle and a cylinder pressure $P(\theta)$ to the coprocessor which stores the operating program as in FIG. 3. This is because the data-drive type processor automatically operates as long as necessary data are provided. And, it is sufficient that the data-drive type processor returns the data of Q as a result of integrating operations when the content of Step 104 in the operating program as in FIG. 3 is satisfied. Then, it is sufficient that the host processor which receives the data carrys out the routine (R1) as in FIG. 2 so as to continue calculating operations of Step 250 and the subsequent steps.

When a self-supporting type processor is used for the data-drive type processor, it is unnecessary to use the host processor and the coprocessor separately, and it is sufficient to use the data-drive type processor as a host processor to carry out all operations.

Since the cylinder capacity $V(\theta)$ and the differential value $dV(\theta)$ in the routine as in FIG. 3 are known values, they can previously memorized in a one-dimensional data table concerning $\theta$, and can be used by the data-drive type processor. In this case, a time for operation can be shortened.

Explanation has been made as to use of the effective calorific value Q in the embodiment of the present invention. However, a value of effective combustion rate K may be used instead of the effective calorific value Q because the effective combustion rate K (=Q/Hu) shows single peak characteristic with respect to ignition timing if fuel to be used is not changed.

There is a graphically represented average effective pressure Pi as an element of work obtained in one ignition cycle. Accordingly, it is considered that an ignition timing is controlled so as to give the maximum pressure Pi. However, as well known, it is necessary to conduct integration (0-720 deg) for the four steps (intake, compression, expansion, exhaust) to obtain a graphically represented average effective pressure Pi by calculation. On the other hand, in order to obtain the effective calorific value Q, it is sufficient to conduct integration (0-360 deg) for only two steps (compression and expansion). This is a distinct feature.

In the above-mentioned embodiment, the number of cylinders is not critical. It is possible to control the ignition timing for each cylinder by using an inner pressure sensor for each of the cylinders. It is also possible to control ignition timing by providing an inner pressure sensor for only one cylinder.

Further, in the above-mentioned embodiment, description has been made as to an engine provided with an electronically controlled fuel injection apparatus. However, the present invention is applicable to any type of engine provided with means for controlling electronically ignition timing.

Thus, in accordance with the present invention, an effective calorific value Q and an effective combustion rate K of fuel in one ignition cycle are obtained on the basis of information of cylinder inner pressure $P(\theta)$ and cylinder capacity $V(\theta)$, ignition timing is controlled by using at least one data so that the effective calorific value Q and the effective combustion rate K becomes the maximum. Accordingly, the maximum torque can always be obtained regardless of a kind of fuel and knocking and regardless of change with time of engine and the fuel to be used.

Obviously, numerous modifications and variations of the present invention are possible in light of the above teachings. It is therefore to be understood that within the scope of the appended claims, the invention may be practiced otherwise than as specifically described herein.

What is claimed is:

1. An ignition timing control apparatus for an internal combustion engine which comprises:
    a first detecting means for detecting an inner pressure of a cylinder of the engine,
    a second detecting means for detecting a crank angle of the engine, and
    a control device which receives the detection signals of said first and second detecting means so that an effective calorific value Q of fuel in one ignition cycle and one of an effective combustion rate K of fuel and a low level calorific value Hu of fuel are calculated on the basis of an inner pressure of cylinder $P(\theta)$ at a crank angle in compression and expansion strokes in said one ignition cycle, the crank angle $\theta$ and a cylinder capacity $V(\theta)$, whereby ignition timing is controlled based on at least one of said effective calorific value Q and said effective combustion rate K.

2. The ignition timing control apparatus according to claim 1, wherein said control device comprises means for calculating the effective calorific value Q in one ignition cycle by using an equation:

$$Q = \frac{1}{K-1} [K \int P(\theta) dV(\theta) + \int V(\theta) dP(\theta)]$$

where K is a ratio of specific heat; including means for memorizing in a data table in a memory the values of cylinder capacity $V(\theta)$ at crank angles $\theta$ and differentials $dV(\theta)$ of $V(\theta)$ of the crank angles, and means for using said data memorized in said data table at the time of calculation.

3. The ignition timing control apparatus according to claim 1, wherein said control device comprises means for operating a processor to calculate the calorific value Q in one ignition cycle.

4. The ignition timing control apparatus according to claim 3, wherein said processor is a data drive type processor.

5. The ignition timing control apparatus according to claim 1, including means for changing an ignition timing to a basic ignition timing when the effective calorific value Q of fuel in one ignition cycle is smaller than a predetermined value Qo.

6. The ignition timing control apparatus according to claim 1, wherein said control device comprises means for effecting an ignition timing control so that the width of control is in proportion to $\alpha \times \Delta Q$ only when the absolute value $|\Delta Q|$ of the effective calorific value Q between the present time and that of the previous time is greater than a predetermined value $\Delta Q0$ and the engine is in a warm mode.

7. The ignition timing control apparatus according to claim 6, wherein the values Q0, $\Delta Q0$ and $\alpha$ are stored in connection with at least two parameters representing working points of the engine.

8. The ignition timing control apparatus according to claim 7, wherein said two parameters representing operating points of the engine comprise one pair of parameters from the group of pairs of parameters consisting of torque and engine revolution number, intake air pressure and engine revolution number, and intake air quantity per revolution number and engine revolution number.

* * * * *